United States Patent [19]
McKenzie et al.

[11] Patent Number: 5,737,979
[45] Date of Patent: Apr. 14, 1998

[54] METHOD OF CALIBRATING CLUTCHES IN A TRANSMISSION

[75] Inventors: Philip C. McKenzie; Ashok K. Kajjam, both of Peoria, Ill.

[73] Assignee: Caterpillar Inc., Peoria, Ill.

[21] Appl. No.: 707,880

[22] Filed: Sep. 9, 1996

[51] Int. Cl.⁶ .................................................. F16H 61/06
[52] U.S. Cl. .................................................. 74/731.1
[58] Field of Search ........................ 74/731.1, 733.1; 192/3.58, 111 R, 110 R

[56] References Cited

U.S. PATENT DOCUMENTS

| | | | |
|---|---|---|---|
| 4,283,970 | 8/1981 | Vukovich | 74/866 |
| 4,401,200 | 8/1983 | Heidemeyer et al. | 192/0.076 |
| 4,646,891 | 3/1987 | Braun | 192/0.032 |
| 4,805,750 | 2/1989 | Nitz | 192/3.58 |
| 4,855,913 | 8/1989 | Brekkestran et al. | 364/424.1 |
| 4,989,471 | 2/1991 | Bulgrien | 74/336 |
| 5,082,097 | 1/1992 | Goeckner et al. | 192/32 |
| 5,224,577 | 7/1993 | Falck et al. | 192/0.092 |

*Primary Examiner*—Dirk Wright
*Attorney, Agent, or Firm*—J. W. Burrows

[57] ABSTRACT

Clutches in multi-speed transmission have been initially calibrated in an attempt to determine the point at which the clutch is filled and thus reduce the harshness of engagement of the elements within the clutches during future gear ratio changes in the transmission when being worked under normal conditions. In these earlier attempts at calibrating the clutches, the desired pressure level needed to fill the clutch was either empirically derived or calibrated by incrementally increasing or stepping the pressure level from a minimum value to the required value. In the subject invention, the clutches are calibrated by using a method of calibration that is substantially the same method that is used during normal operating conditions. By using substantially the same method, any effects of "hysteresis" of the associated valving is basically eliminated.

8 Claims, 6 Drawing Sheets

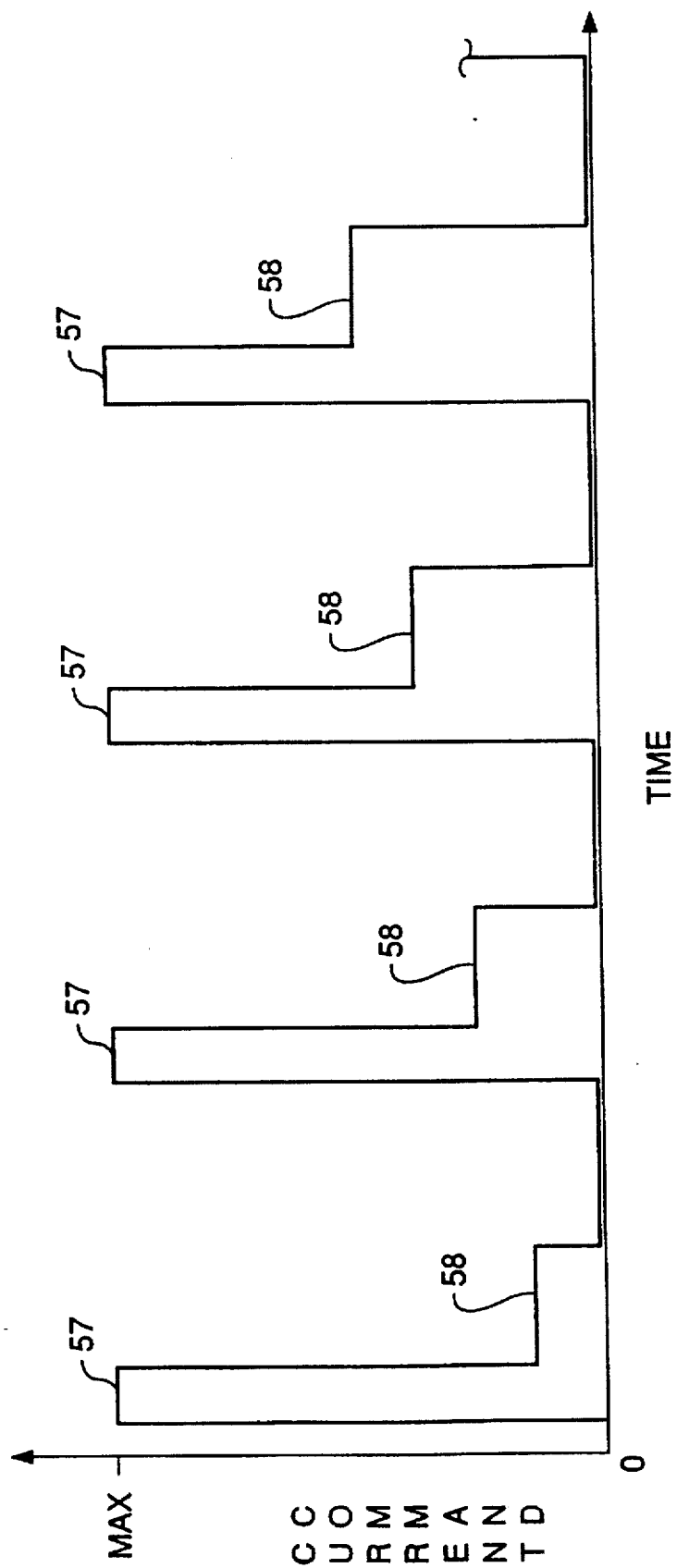

METHOD OF CALIBRATING CLUTCHES IN A TRANSMISSION

TECHNICAL FIELD

This invention relates generally to a method of calibrating clutches in a transmission and more particularly to a method of calibrating clutches in a transmission to more closely control the calibrated pressure level relatively to the pressure used during normal use of the transmission in a machine.

BACKGROUND ART

Generally, it is necessary to determine the pressure level needed to quickly fill a fluid actuated clutch to a point that the clutch is able to transmit a predetermined amount of torque and then progressively increase the pressure level until the clutch is fully engaged without permitting a "jerk" or other forms of harsh engagement. In the past, it has been known to empirically determine the desired pressure level and store the desired pressure level in an electronic control module. Likewise, it has been known to determine and store in memory the desired pressure level by applying a small level of pressure to the clutch, compare the speed of the engine after the small level of pressure is applied to a known engine speed, if the engine speed has not changed, then the level of pressure is incremented or stepped upward and the engine speed is again compared, the level of pressure is progressively incremented or stepped up until the engine speed changes a predetermined amount, thus indicating that the clutch has filled and is capable of transmitting torque. Once the proper pressure level has been determined, the pressure level is stored in the memory of an electronic control module and is used for further shifts during normal operation. During normal operation of these known clutch control arrangements, the clutches are actuated in response to an electrical current being directed to a solenoid operated proportional valve. The solenoid operated proportional valve directs pressurized fluid thereacross in proportion to the electrical signal being directed thereto. During normal operation of these known control systems, the full electrical current is directed to the solenoid operated proportional valve for a short interval to initiate valve movement and is then reduced to a current level that is needed for the proper pressure level to fill the fluid actuated clutch to the point at which the fluid actuated clutch is capable of transmitting torque. The pressure level is then progressively increased until the clutch is fully engaged. Since the proper fill pressure for each of the clutches in these known control arrangements has been determined by empirical methods or by incrementing or stepping up the pressure during calibration, the pressure level obtained during calibration may vary from the pressure level actually applied during normal use. This is based on the fact that the operation of hydraulic valves vary from one another. More specifically, the fit of the spool in the valve body bore varies from one valve to another due to manufacturing tolerances and the normal wear between the valve spool and the valve body bore during normal use. Each of these known facts causes the valve to require different actuating control pressures in order to obtain the same operating pressure to the fluid actuated clutch. Likewise, the spring rate in valves may also vary thus offsetting the required actuating pressure needed. Consequently, it is important to calibrate the respective fluid actuated clutches generally under the same conditions that they experience during normal operating conditions.

The present invention is directed to overcoming one or more of the problems as set forth above.

DISCLOSURE OF THE INVENTION

In one aspect of the subject invention a method of calibrating fluid actuated clutches inn a multi-speed transmission is provided. The multi-speed transmission is operably disposed in a machine having a source of pressurized fluid, an engine drivingly connected to the multi-speed transmission and a drive train with an associated park brake operatively connected to the transmission. The multi-speed transmission has an input drive shaft, an output drive shaft and a plurality of gears rotatably housed in the multi-speed transmission in driving relationship with the input and the output drive shafts such that selective engagement of the respective fluid actuated clutches provide various operating output speeds to the power train. Each of the fluid actuated clutches is controlled by respective solenoid operated valves in response to receipt of an electrical current. The multi-speed transmission further includes an electrical control system having an electronic control module operative in response to a command input signal to control engagement of the fluid actuated clutches by directing an electrical current to the respective solenoid operated valves. The method comprises the steps of setting the park brake to restrain the machine from moving, determining a reference machine parameter indicative of torque being applied to the input shaft, conditioning the electronic control module to a calibration mode, and engaging at least one of the fluid actuated clutches by selectively controlling the level of electrical current to the associated solenoid operated valve. The method also includes pulsing the level of the electrical current to another one of the solenoid operated valves that is being calibrated to direct the pressurized fluid to the the fluid actuated clutch being calibrated, changing the level of the electrical current to a hold level that corresponds to a minimum hold pressure level, allowing time for the clutch being calibrated to fill, determining if it is filled by comparing the current machine parameter to the reference machine parameter, draining the clutch being calibrated if the current machine parameter is still substantially the same as the reference machine parameter, increasing the minimum hold pressure level by a predetermined amount by changing the level of the electrical current by a predetermined amount, repeating the steps of pulsing the level, changing the level, allowing time, determining, draining and increasing until the current machine parameter is different from the reference machine parameter by a predetermined amount, and storing the electrical current level in the electronic control module that corresponds to the pressure level required in the clutch being calibrated that is indicative of torque being applied to the input shaft.

BRIEF DESCRIPTION OF THE DRAWINGS

FIG. 4 is a time chart illustrating the relationship of the electrical current command input relative to time during the calibration of one of the fluid actuated clutches;

BEST MODE FOR CARRYING OUT THE INVENTION

Figure 1:
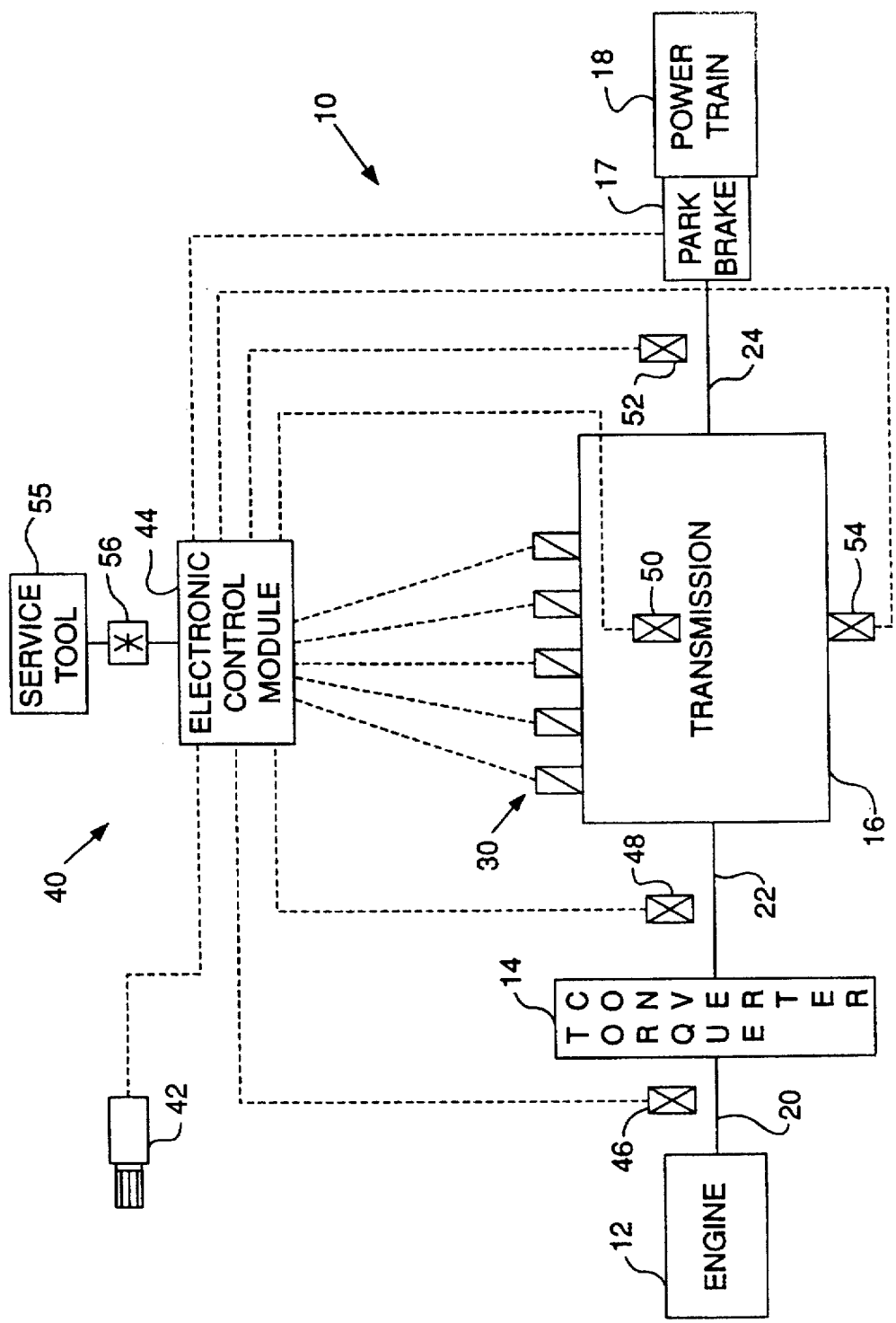
FIG. 1 is a diagrammatic representation of a machine system having an electronic control module for controlling a transmission of the machine.
Figure 2:
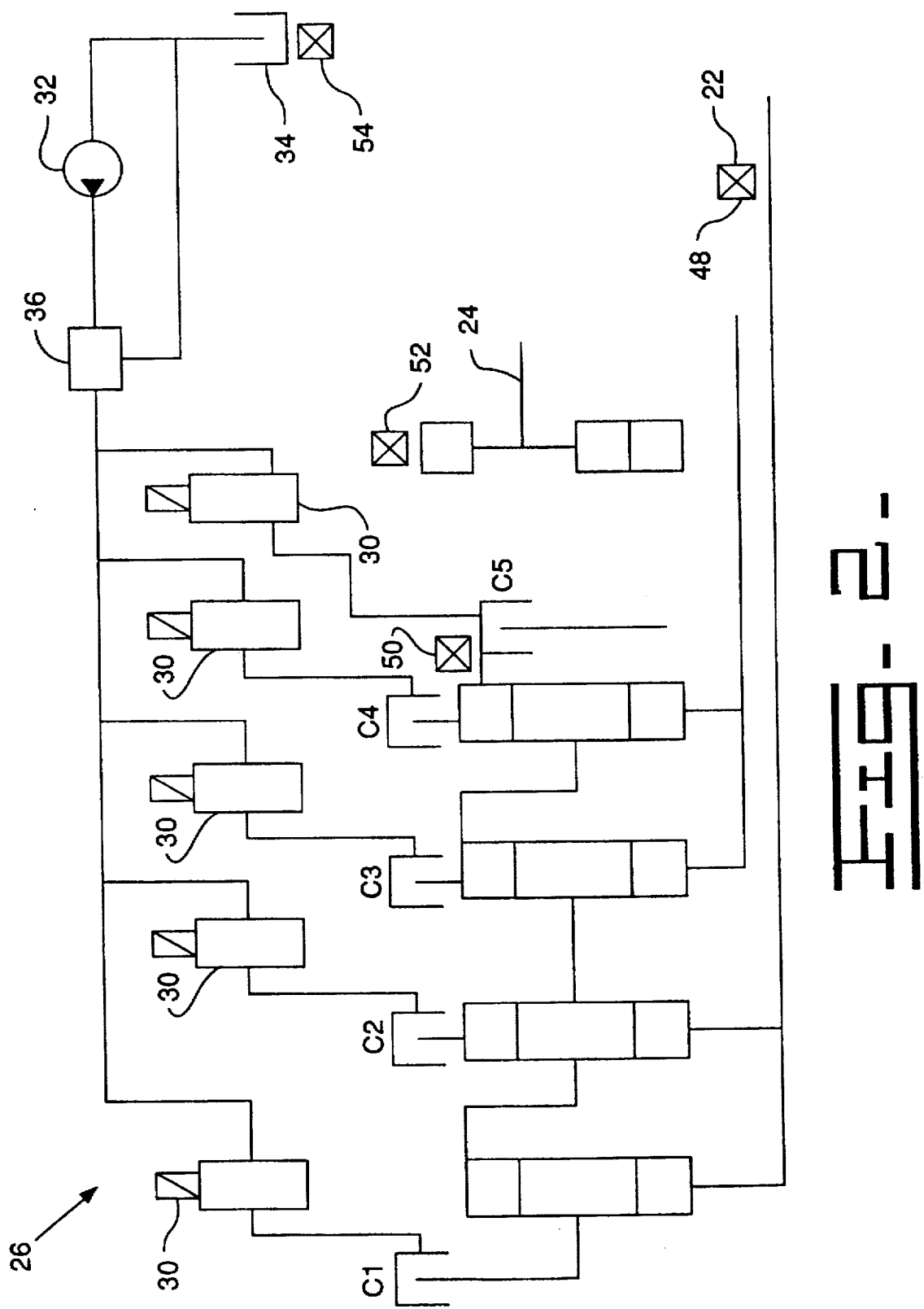
FIG. 2 is a diagrammatic representation of the transmission of FIG. 1.

Referring now to the drawings, and more particularly to FIGS. 1 and 2, a machine system 10 is diagrammatically illustrated and includes an engine 12, a torque converter 14, a multi-speed transmission 16, a park brake 17 and a power train 18. The engine 12 is connected to the torque converter 14 via a shaft 20, the torque converter 14 is connected to the transmission 16 via an input shaft 22, and the transmission 16 is connected to the park brake 17 and the power train 18 via an output shaft 24. It is recognized that the park brake 17 could be an integral part of the transmission 16 or the power train 18.

FIG. 2 represents an example of one transmission gear set 26 that may be utilized with the subject invention. It is recognized that other gear sets could be utilized without departing from the essence of the subject invention. The subject transmission gear set 26 includes five fluid actuated clutches, herein after referred to as clutches C1–C5, where C1 is a reverse direction clutch, C2 is a forward direction clutch and clutches C3–C5 are speed clutches. Various gear ratios are provided by selectively engaging and disengaging combinations of the respective clutches C1–C5. In the subject arrangement it is required to have at least one direction clutch C1,C2 and one speed clutch C3,C4,C5 engaged to transmit torque to the drive train 18. The clutches are actuated by pressurized fluid and upon engagement, require fill time before torque is transmitted between driving and driven friction elements therein. That is, the fill time is the elapsed time that the clutch piston moves from the released to the engaged position. The clutches are selectively engaged and disengaged by solenoid operated proportional pressure control valves 30, herein after referred to as solenoid control valves. The hydraulic circuit of the multi-speed transmission 16 includes a source of pressurized fluid, such as a pump 32, that supplies pressurized fluid from a reservoir 34 to the clutches C1–C5 through the associated solenoid control valves 30. A relief valve 36 controls the maximum pressure level in the hydraulic circuit.

Referring back to FIG. 1, an electrical control system 40 is illustrated and operative to obtain the various gear ratios by controlling the engagement and disengagement of the clutches C1–C5 in the multi-speed transmission 16. The electrical control system 40 includes an operator command input shifter mechanism 42 operative in response to an operator's input to direct an electrical signal therefrom representative of the direction and gear ratio desired by the operator. An electronic control module 44 receives the direction and gear ratio signal from the operator command input shifter mechanism 42 and responsively controls the operation of the respective solenoid control valves 30. The electronic control module 44 also receives various other input signals representative of various operating parameters of the machine system 10. Such other input signals include an engine speed signal from an engine speed sensor 46, a transmission input speed signal from a transmission input speed sensor 48, a transmission intermediate speed signal from a transmission intermediate speed sensor 50, a transmission output speed signal from a transmission output speed sensor 52, and a transmission oil temperature signal from a transmission oil temperature sensor 54. The sensors are conventional electrical transducers such as potentiometer, thermistors and/or magnetic speed pickups.

A service tool 55 is illustrated and connected to the electronic control module 44 by a plug in type connection 56. The service tool 55 is utilized to condition the electronic control module 44 to the clutch calibration mode. It is recognized that the function of the service tool 55 could be a part of the electronic control module Even though the intermediate speed sensor 50 is shown in FIG. 2 as being adjacent clutch C4, the intermediate speed sensor 50 could be adapted to sense the rotational speed of any one of the clutches or ring gears in the illustrated transmission gear set 26. The transmission speed signals are helpful to determine the individual rotational speeds of any one clutch or ring gear. For example, the clutch slip of any one of the speed clutches may be determined in response to the transmission output and the intermediate speed signals. Additionally, the clutch slip of any one of the direction clutches may be determined in response to the transmission input and the intermediate speed signals. Such determinations are based on the specific gear ratios of the transmission 16 in a manner well known in the art.

Internally, the electronic control module 44, in a well known manner comprises a number of conventional devices including a microprocessor with an internal clock and memory, an input/output device, and an array of proportional solenoid current drivers. One solenoid driver is dedicated to each solenoid control valve 30. The microprocessor delivers a command signal proportional to the desired solenoid current driver, and the current driver uses a Pulse Width Modulated voltage to produce the desired current. The solenoid control valves 30 are configured to maintain a flow of oil to the clutch sufficient to maintain a clutch pressure proportional to the solenoid current. Thus, the microprocessor can control the clutch pressure proportional to the current command signal delivered to the solenoid driver circuit. Proportional solenoid current drivers are well known in the art and need not be further discussed.

The microprocessor utilizes arithmetic units to control the transmission 16 shifting to the various gear ratios in accordance with software programs. Typically, the programs are stored in read-only memory, random-access memory or the like. The programs relating to the subject invention are discussed in relation to flowcharts discussed later.

Figure 3:
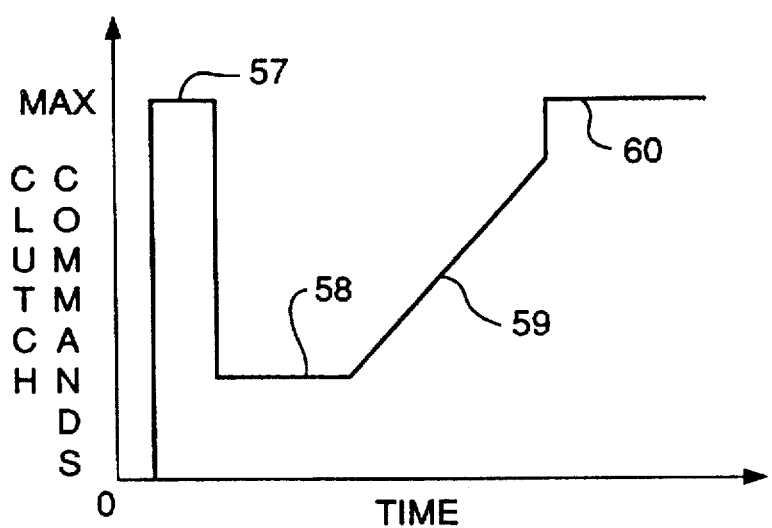
FIG. 3 is a time chart illustrating the relationship of the clutch command input relative to time for the engagement of a typical fluid actuated clutch.

A typical clutch current command that control the engagement of the clutches is shown in FIG. 3. The current command is shown with respect to time. As show, the current command is pulsed at a high level for a predetermined amount of time, as indicated by line 57, to quickly open the desired solenoid control valve 30 in order to begin filling the corresponding clutch. The current command is then lowered and maintained at a hold level, as indicated by line 58, to completely fill the clutch. The value of the hold level is high enough to insure completion of clutch fill, yet low enough to prevent excessive torque being transmitted when the clutch elements "touch-up." After the clutch is filled, the clutch enters a modulation phase, as indicated by line 59. The corresponding current command is controlled either closed-loop or open-loop to gradually increase the clutch pressure in order to cause a desired decrease in clutch slip. Once the clutch locks-up or engages, the current command increases to the maximum pressure level, as indicated by line 60. It is recognized that various forms of time chart of FIG. 3 could be utilized without departing from the essence of the invention. For example, the speed clutches C3–C5 could be more quickly engaged, if one of the directional clutches C1–C2 is being subsequently engaged to carry the toque loads being transmitted through the transmission to the drive train 18.

Note that the "end-of-fill" of the respective clutches may be determined by various methods, such as dedicated end-of-fill detection sensors, timing methods or other known end-of-fill detection methods. Additionally, clutch "tough-up" may be indicated by monitoring clutch slip, change in torque converter ratio, or a drop in engine speed.

Referring to FIG. 4, a time chart illustrates a series of current commands utilized when calibrating respective ones of the clutches C1–C5. Respective portions of the time chart in FIG. 4 relates back to the time chart described with respect to FIG. 3. Consequently, like elements or lines have like element numbers. At the start of clutch calibration, the electrical current is pulsed for a period of time to a high level, as indicated by the line 57 to open the solenoid control valve 30 of the clutch being calibrated, lowered to the minimum hold level, as indicated by the line 58, and held for a predetermined time to allow the clutch to fill, then lowered to substantially zero level and held for a predetermined time to allow the clutch to fully drain. As illustrated, the current command is again pulsed to the high level 57, lowered to a hold level 58 that is higher than the previous hold level and held for a predetermined time, lowered to substantially zero and held for a predetermined time. The sequence of pulsing the current command, lowering to a hold level that is higher than the previous hold level, lowering the current to substantially zero continues until a hold level is reached that allow the clutch to completely fill.

Figure 5:
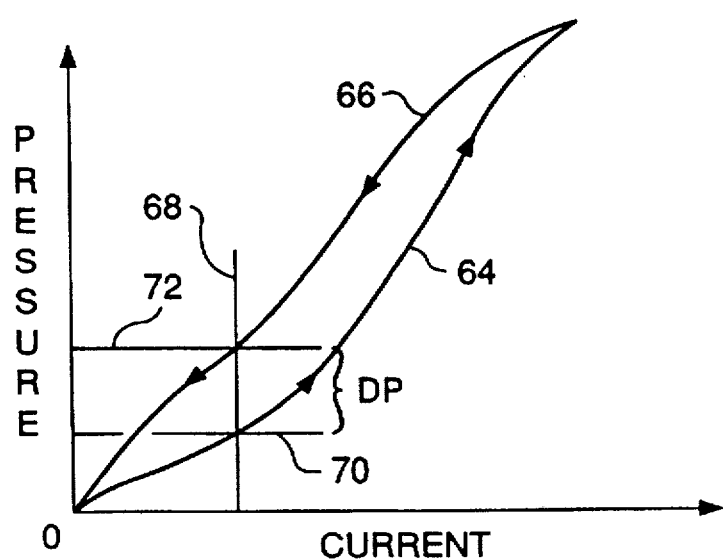
FIG. 5 is a chart illustrating the relationship of the pressure being applied to the clutch being calibrated as compared to the current or electrical signal being directed to the solenoid operated clutch control valve.

Referring to FIG. 5, the illustrated chart illustrates the relationship of the applied current to the actual pressure in the fluid actuated clutch. The line 64 indicates the relationship of the pressure in the respective clutches as the current to the respective solenoid control valves 30 is increased. Line 66 indicates the relationship of the pressure in the respective clutches when the current to the respective solenoid control valves 30 has first been pulsed to a high level and subsequently reduced to a lower level. More specifically, if a predetermined current is applied to the respective solenoid valves 30, a resulting pressure, as indicated by horizontal line 70, results in the corresponding clutch. On the other hand, for the same level of current represented by the vertical line 68, a different pressure exists in the corresponding clutch, as indicated by the horizontal line 72. The difference in pressure DP acting within the clutch is attributed to various factors, such as, tolerances between the spool and spool bore within the solenoid control valve, wear of the spool and spool bore during use, and/or difference in spring rates of the springs within the solenoid valves as compared to each other. This difference in pressure DP is many times referred to as the "hysteresis" of the solenoid control valves 30.

Figure 6:
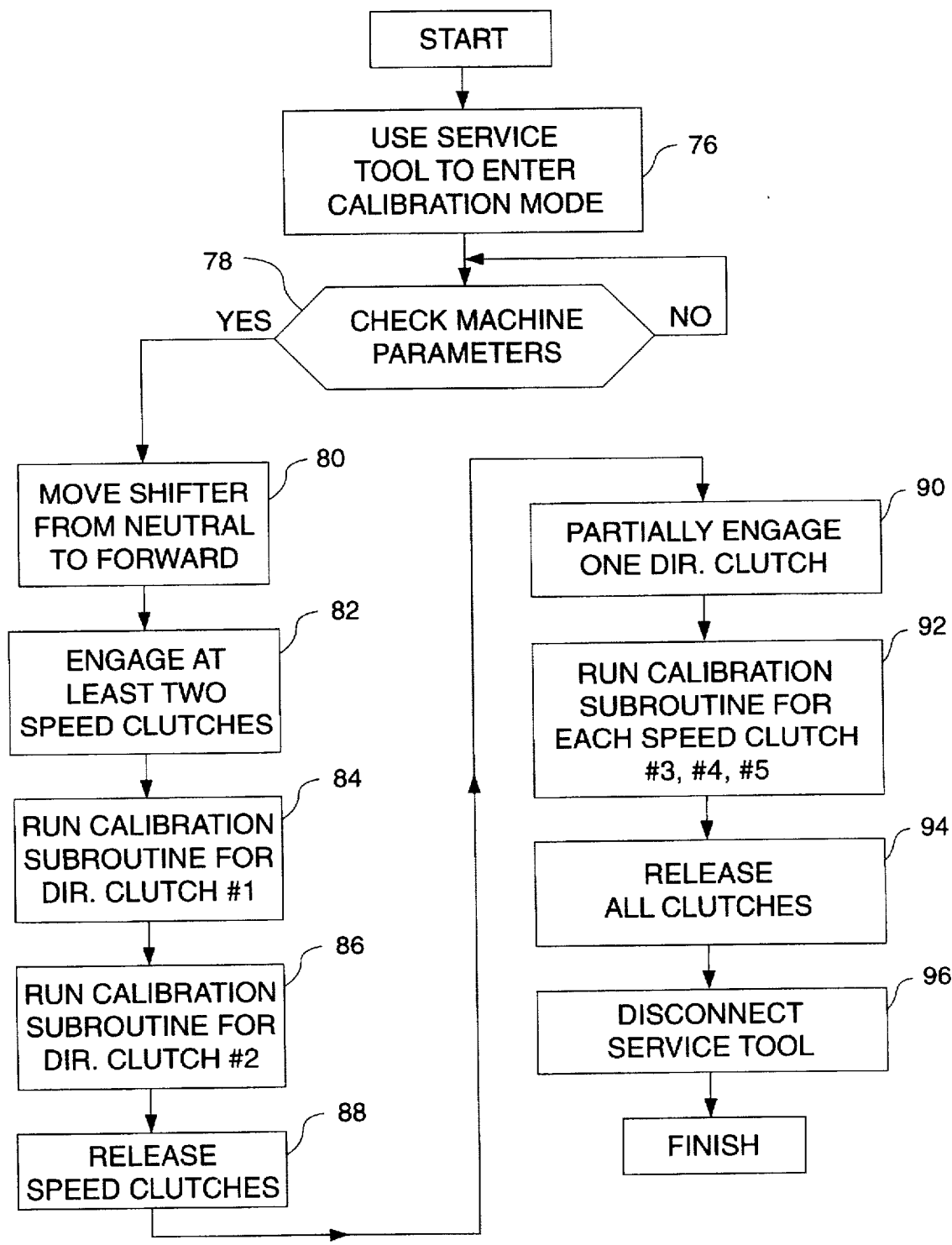
FIG. 6 is a top level flowchart of the program for calibrating the respective fluid actuated clutches.
Figure 7:
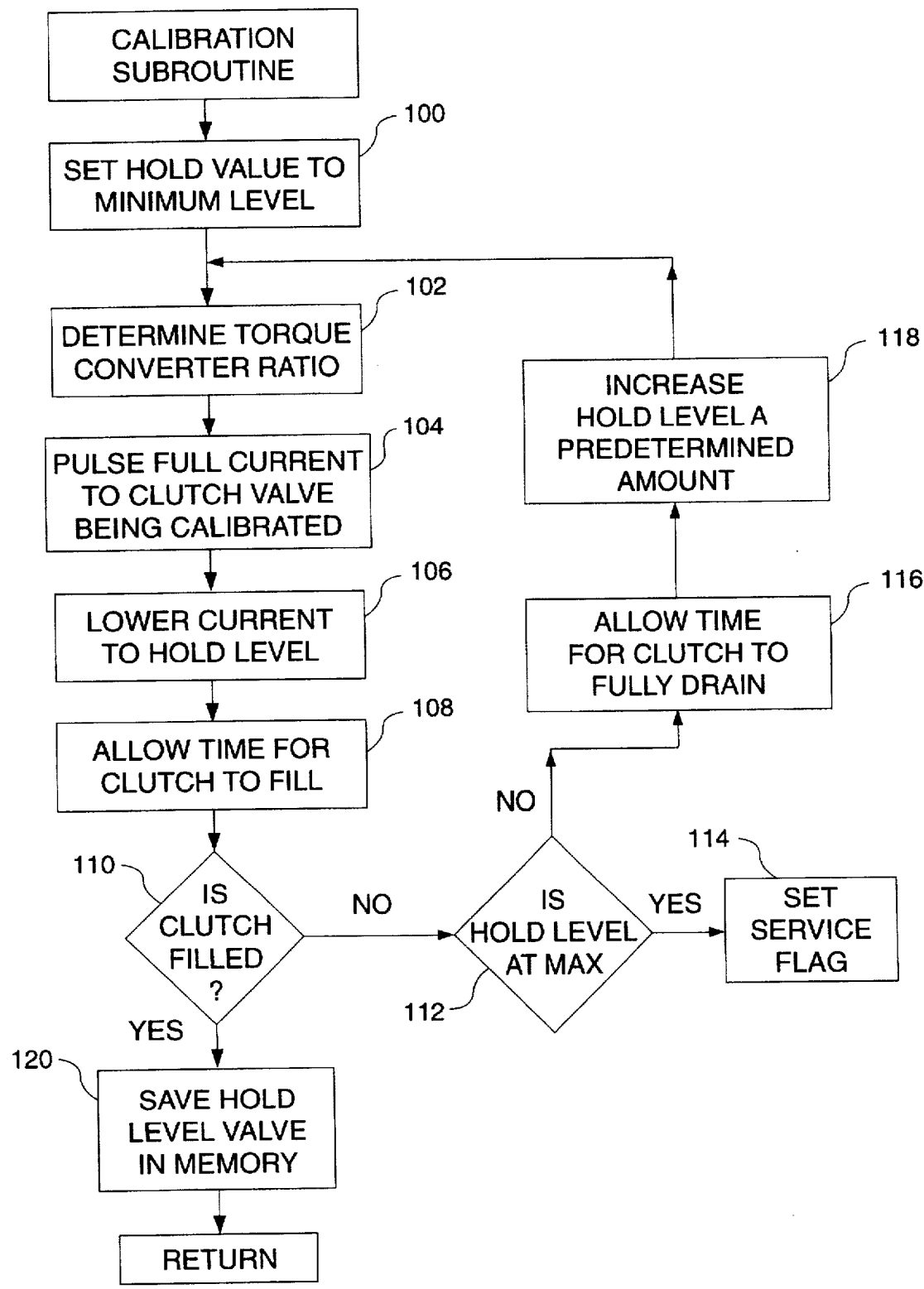
FIG. 7 is a low level flowchart of a subroutine used in the calibration of the respective fluid actuated clutches.

Referring to FIGS. 6 and 7, flowcharts are illustrated representing computer program instructions to be executed by the computer-based electronic control module 44 of FIG. 1 in carrying out tile clutch calibration method of the present invention. FIG. 6 represents an executive or main loop program of the clutch calibration method, which directs the execution of the subroutine illustrated in FIG. 7. To start the program, the service tool 55 is connected to the electronic control module 44 and, as indicated by block 76, is used to set the electronic control module to the calibration mode. As indicated by the decision block 78, the program first checks various machine parameters, such as: is the park brake applied, is the engine at high idle, is the hydraulic oil warm, is the transmission in the neutral gear ratio, and is the speed of the machine at zero. If the answer to any of the machine parameter checks is NO, the program does not proceed until any problems are fixed and all conditions are met. Once all machine parameters are satisfied, the calibration method continues. At block 80, the operator moves the command shifter 42 from the neutral position to a forward position and as indicated at block 82 engages at least two speed clutches. At block 84, the subroutine illustrated in FIG. 7 is ran for directional clutch C1. Following the running of the subroutine for the directional clutch C1, as illustrated in block 86, the subroutine of FIG. 7 is ran for the directional clutch C2. Following the completion of the subroutine for directional clutch C2, the calibration method advances to block 88 where the previously engaged speed clutches are released. At block 90, one of the directional clutches is partially engaged to a point at which there would not be sufficient torque permitted therethrough to overcome the braking force being applied by the park brake 17. At block 92 the subroutine is ran for each of the respective speed clutches C3–C5. Following completion of running the subroutine for the speed clutches C3–C5, the calibration method proceeds to block 94 where all clutches are released. At block 96, the service tool 55 ends the clutch calibration mode and is disconnected from the electronic control module 44.

In running the subroutine of FIG. 7, block 100 sets a minimum hold value for the clutch being calibrated. The routine continues to block 102 where a reference machine parameter, such as the torque converter ratio is determined. At block 104, the full current is pulsed to the solenoid control valve being calibrated for a predetermined time. At block 106, the level of the current is lowered to the hold level and at block 108 time is allowed for the clutch to fill. At block 110, the program checks to determine if the clutch has filled.

If the clutch has not completely filled, the routine proceeds to block 112. At block 112, the program determines whether the hold level is at the maximum level and if it is, the routine proceeds to block 114 and sets a service flag.

If the hold level is not at the maximum level, the routine proceeds to block 116 where time is allowed for the clutch to fully drain or empty. The routine then proceeds to block 118 where the hold level is increased by a predetermined amount. Following increasing the hold amount, the routine loops back to a location between the blocks 100,102 and continues.

The loop continues until at block 110 it has been determined that the clutch is filled. Once the clutch has filled, the routine continues to block 120 where the hold level that achieved clutch fill is saved to memory in the electronic control module. At this point the subroutine is complete and returns to the calibration method of FIG. 6.

Industrial Applicability

In the operation of the subject method of calibrating the fluid actuated clutches in a multi-speed transmission, a service tool 55 is connected to the electronic control module 44 and used to place the electronic control module 44 in the calibration mode. As previously set forth, the clutches in the transmission includes both directional clutches C1–C2 and speed clutches C3–C5.

As set forth in the time chart of FIG. 3, during normal use the respective clutches are engaged by first pulsing the current to a high level or maximum current level for a period of time. The high level of current being directed to the associated solenoid control valve quickly moves the solenoid control valve to an open position directing fluid flow thereacross to the clutch being engaged. Following the high pulsed current, the current level is lowered to a hold level that is sufficient to completely fill the clutch and place the clutch in a condition of transmitting torque therethrough. The end-of-fill is determined by detecting a predetermined change in the ratio across the torque converter 14 and/or by detecting that the slip in the clutch is being reduced towards zero slip. As illustrated, subsequent to the clutch being filled, the pressure level therein is gradually increased by gradually increasing the current being directed to the solenoid control valve 30.

As set forth in FIG. 4, during the calibration of each of the clutches C1–C5, the current is first pulsed to a high level for a period of time, then lowered to a hold level for a period of time, and then reduced to substantially zero for a period of time. The noted steps are repeated a number of times and each time that the steps are repeated the hold level is increased a predetermined amount until a hold level has been achieved that relates to a point at which the clutch is filled and is capable of transmitting torque.

The steps illustrated in FIG. 4 relate to the flow of fluid to the clutch being calibrated and the pressure of the fluid therein at each hold level. For example, the high pulsed current forces the solenoid valve to quickly open to start filling the clutch. The reduced hold level relates to the pressure level permitted in the actuating chamber of the fluid clutch. As is well known in the art, the fluid flow to the clutch acts against a piston which moves against the bias of a spring mechanism to force the elements of the clutch to engage. If the pressure level in the clutch is not sufficient to overcome the bias of the spring mechanism, the clutch will not completely fill. Consequently, after the time for filling has elapsed and the clutch has not filled, the clutch is allowed to drain for a predetermined period of time. Once the drain time has elapsed, the solenoid control valve 30 ia again quickly opened to again initiate filling of the clutch. By lowering the current to a level higher than the previous level, the fluid filling the clutch is permitted to reach a higher pressure level. The higher pressure level may be sufficient to provide limited movement against the biasing mechanism but still not be sufficient to fill the clutch. During each subsequent sequence of steps, the pressure level of the fluid in the clutch increases until a point is reached at which the clutch completely fills and is capable of transmitting toque.

From a review of FIG. 5, it is noted that by using the same steps during the calibration of the respective clutches as is being used during normal operations the "hysteresis" or pressure difference DP is substantially eliminated. Consequently, during use the point at which the clutches are filled is substantially the same point at which the clutch was calibrated and the "touch-up" of the elements within the clutch is more smooth and reduces the tendency of the machine experiencing a jerk during clutch engagement.

It may be necessary to re-calibrate the clutches C1–C5 any time any of the solenoid control valves 30 are replaced or serviced, any of the clutches are replaced, the electronic control module 44 is replaced or at any time harsh clutch engagements are continuously experienced.

Other aspects, objects and advantages of the present invention can be obtained from a study of the drawings, the disclosure and the appended claims.

We claim:

1. A method of calibrating fluid actuated clutches in a multi-speed transmission operably disposed in a machine having a source of pressurized fluid, an engine drivingly connected to the multi-speed transmission and a drive train with an associated park brake operatively connected to the transmission, the multi-speed transmission having an input drive shaft, an output drive shaft and a plurality of gears rotatably housed in the multi-speed transmission in driving relationship with the input and the output drive shafts such that selective engagement of the respective fluid actuated clutches provide various operating output speeds to the power train, each of the fluid actuated clutches being controlled by respective solenoid control valves in response to receipt of an electrical current, the multi-speed transmission further includes an electrical control system having an electronic control module operative in response to a command input signal to control engagement of the fluid actuated clutches by directing an electrical current to the respective solenoid control valves, the method comprises the steps of:

setting the park brake to restrain the machine from moving;

determining a reference machine parameter indicative of torque being applied to the input shaft;

conditioning the electronic control module to a calibration mode;

engaging at least one of the fluid actuated clutches by selectively controlling the level of electrical current to the associated solenoid control valve;

pulsing for a time period the level of the electrical current to the solenoid control valve being calibrated to direct the pressurized fluid to the associated fluid actuated clutch;

changing the level of the electrical current to a hold level that corresponds to a minimum hold pressure level;

allowing time for the clutch being calibrated to fill;

determining if the clutch being calibrated is filled by comparing the current machine parameter to the reference machine parameter;

draining the clutch being calibrated if the current machine parameter is still substantially the same as the reference machine parameter;

increasing the minimum hold pressure level by a predetermined amount by changing the level of the electrical current by a predetermined amount;

repeating the steps of pulsing the level, changing the level, allowing time, determining, draining and increasing until the current machine parameter is different from the reference machine parameter by a predetermined amount; and storing the electrical current level in the electronic control module that corresponds to the pressure level required in the clutch being calibrated that is indicative of torque being applied to the input shaft of the transmission.

2. The method of claim 1 wherein the machine includes a torque converter located between the engine and the multi-speed transmission and the reference machine parameter is a torque converter ratio that is determined when the transmission is not subjected to any loads.

3. The method of claim 2 wherein in the step of pulsing of the level of the electrical current includes increasing the level of current from zero to a maximum level and in the step of changing of the level of electrical current includes decreasing the level of the current.

4. The method of claim 3 wherein in the step of engaging at least one of the fluid actuated clutches includes fully engaging the one fluid actuated clutch.

5. The method of claim 4 wherein the fluid actuated clutches in the multi-speed transmission includes directional clutches and speed clutches and in the step of engaging at least one of the fluid actuated clutches includes fully engaging at least two speed clutches while calibrating the respective directional clutches.

6. The method of claim 5 wherein in the step of determining a reference machine parameter includes determining that the speed of the input shaft to the transmission is being reduced towards a zero speed.

7. The method of claim 4 wherein the fluid actuated clutches in the multi-speed transmission includes directional clutches and speed clutches and in the step of engaging at least one of the fluid actuated clutches includes partially engaging one of the directional clutches while calibrating the respective speed clutches.

8. The method of claim 2 wherein in the step of conditioning the electronic control module includes connecting a service tool to the electronic control module and using the service tool to condition the electronic control module to the calibration mode.

* * * * *